United States Patent [19]

Guthrie

[11] 3,763,593
[45] Oct. 9, 1973

[54] APPARATUS FOR BRINGING EARTHWORMS TO THE SURFACE OF THE GROUND
[75] Inventor: Tom L. Guthrie, Tulsa, Okla.
[73] Assignee: Lectrasearch Corporation, Tulsa, Okla.
[22] Filed: May 8, 1972
[21] Appl. No.: 251,245

[52] U.S. Cl. ............................... 47/1.3, 200/167 A
[51] Int. Cl. ............................................... A01c 1/00
[58] Field of Search ........................... 47/1.3; 119/1; 200/167, 61.42, 61.62

[56] References Cited
UNITED STATES PATENTS

| | | | |
|---|---|---|---|
| 2,770,075 | 11/1956 | Moore | 47/1.3 |
| 2,607,164 | 8/1952 | Fenton | 47/1.3 |
| 2,334,271 | 11/1943 | Malm et al. | 200/61.42 |
| 2,234,954 | 3/1941 | Bergman | 200/167 A |
| 2,610,237 | 9/1952 | Benner | 200/167 A X |
| 3,331,018 | 7/1967 | Farina | 200/167 A X |
| 1,932,237 | 10/1933 | Warner | 47/1.3 |

Primary Examiner—Robert E. Pulfrey
Assistant Examiner—R. T. Rader
Attorney—William S. Dorman

[57] ABSTRACT

Apparatus for bringing earthworms to the surface of the ground comprising a metallic probe having one end thereof adapted to be inserted in the ground and having an insulated handle slidably mounted at the other end of the probe. An electrical contact means is mounted within the handle and spaced from the end of the probe within the handle. A spring means is mounted in the handle for urging the probe in a direction away from the electrical contact means. A resistor and a neon light are connected in series between the electrical contact means and the other end of the probe within the handle. An opening is provided in the handle to permit visual inspection of the neon light so that it can be determined readily when the neon light is actuated. The electrical contact means connects externally with an electrical plug, through one only of the prings thereof, the other prong being unconnected to anything. Thus, when the probe is inserted in the ground and the prong of the plug is connected to the ungrounded terminal, the neon light will glow. Otherwise, the plug is reversed in the socket. After the neon light glows, the handle is pushed downwardly against the action of the spring and full current will flow through the probe to bring earthworms to the surface of the ground.

2 Claims, 1 Drawing Figure

United States Patent [19]
Guthrie
[11] 3,763,593
[45] Oct. 9, 1973
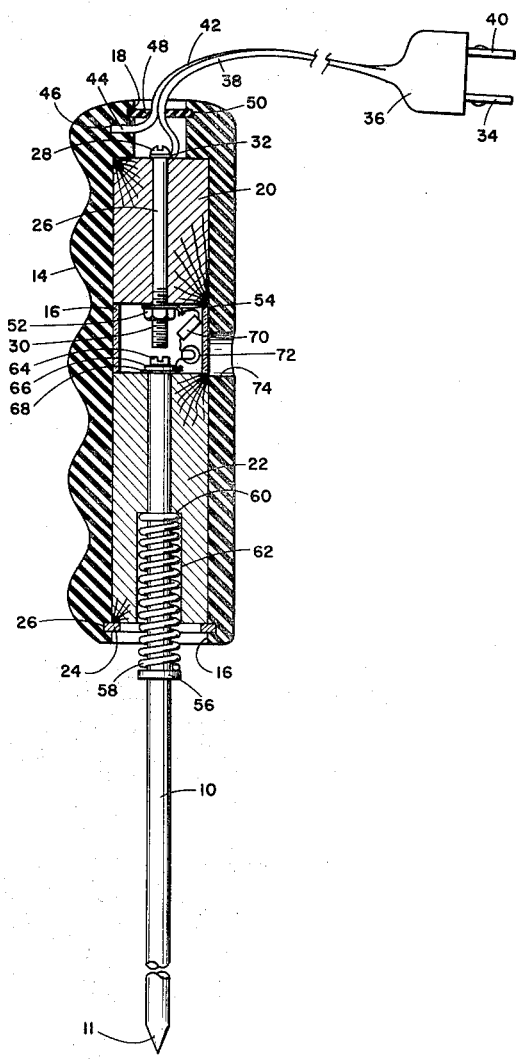

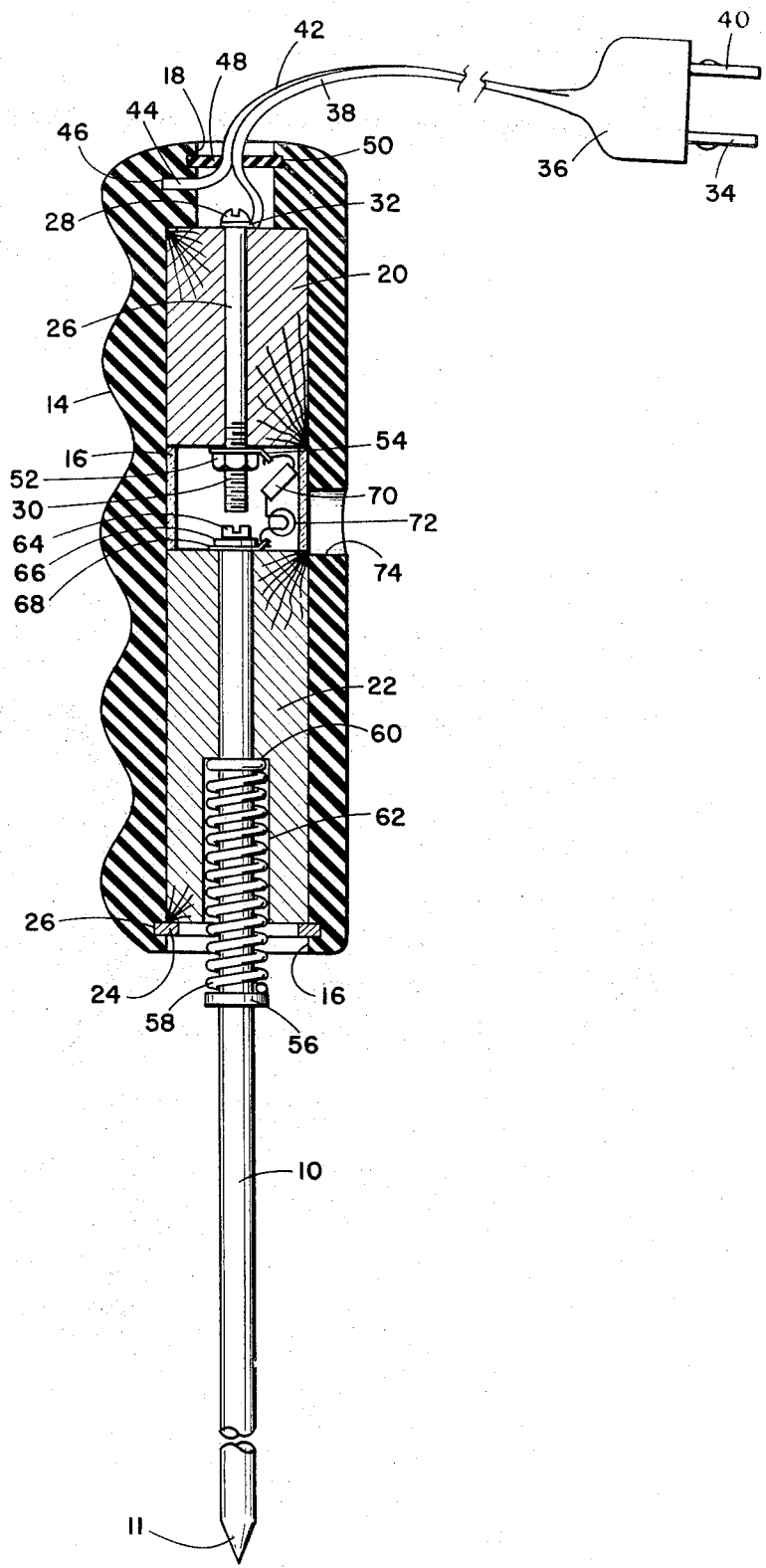

APPARATUS FOR BRINGING EARTHWORMS TO THE SURFACE OF THE GROUND

BACKGROUND OF THE INVENTION

1. Field of the Invention

The present invention relates to an apparatus for bringing earthworms to the surface of the ground by electrical means. More particularly, the present invention involves a metallic probe which is adapted to be inserted in the ground and which is also adapted to be connected to a source of electrical voltage so as to direct a current of electricity in the ground.

2. Description of the Prior Art

Electrical devices have been used for the purpose of bringing earthworms to the surface of the ground. One such device is shown in U. S. Pat. No. 1,932,237 which involves a single probe which is adapted to be inserted in the ground; the probe connects through an ordinary electric light bulb and through a single wire to an electrical socket. The disadvantage of this arrangement, however, is that a person could be severely shocked by touching the probe. Another device is shown in U.S. Pat. No. 2,450,597 which is also of the single probe type and which is provided with a somewhat complicated means for reversing the connections to the socket by means of a tiltable head. Whereas this device is reasonably safe when the head is not tilted, it does not provide an instantaneous means of determining when the probe is connected properly to the ungrounded electrode in the socket.

Another device for bringing earthworms to the surface of the ground is shown in U.S. Pat. No. 2,607,164 which illustrates two electrodes both of which are placed in the ground in spaced relation to each other; this device is provided with a switch and a light to show when current is flowing in a circuit. Still another device for bringing earthworms to the surface of the ground is shown in U.S. Pat. No. 2,770,075 which is of the single probe type, but which is not provided with any safety means or indicating means.

SUMMARY OF THE INVENTION

The present invention involves a metallic probe which has one end adapted to be inserted in the ground. The other end of the metallic probe is received within an insulated handle through a sliding connection; within the handle is an electrical contact means which is normally spaced from the other end of the probe. A spring means, also mounted in the handle and constituting a part of a sliding connection, urges the probe in a direction away from the electrical contact means. A resistor and a neon light are connected in series between the electrical contact means and the other end of the probe to provide, first of all, a safety means to prevent shock if a person should accidentally touch the probe when the device is energized; secondly, the neon light provides a visual signal to indicate when the probe is connected to electricity of the proper polarity. An electrical plug has one of its prongs connected electrically to the electric contact means, the other prong being unconnected. When the connected prong of the plug is in contact with the ungrounded terminal of the standard electrical socket into which the plug is inserted and the probe is in the ground, the neon light will glow. Thereafter, the handle can be pushed against the action of the spring so as to short circuit the resistor and the neon light to permit the passage of current into the ground through the probe.

BRIEF DESCRIPTION OF THE DRAWING

The Drawing is a side view of the apparatus of the present invention showing the handle portion and certain of the internal components in the handle in cross section.

DESCRIPTION OF THE PREFERRED EMBODIMENT

Referring to the drawings in detail, there is shown a metal probe 10 attached to a handle 12. As illustrated, the probe 10 is broken to indicate that the probe is considerably longer than the handle 12. According to a preferred embodiment of the invention, the probe will project from 10 to 11 inches below the handle 12, and the latter would be between 4 and 5 inches in length. The lower end of the probe terminates in a pointed end 11 for a purpose which will appear hereinafter.

The handle 12 is preferably a piece of hollow rubber or plastic having at least one side portion 14 thereof provided with a gripping surface as shown. The handle or grip member 12 is provided with an internal bore 16 extending from the bottom of the handle to a location near the top end thereof where the bore 16 meets with a reduced bore 18. A piece 20 of ¾ inch diameter dowell wood is mounted in the upper end of the bore 16 and a slightly longer piece 22 of ¾ inch diameter dowell wood is mounted in the lower end of the bore 16. The two pieces of wood 20 and 22 are separated by a hollow cylindrical sleeve 16 of plexiglass or other transparent plastic material. The two wooden pieces 20 and 22 together with the plastic plexiglass sleeve 16 are held in the bore or cavity 16 by means of a retaining ring 24 which is received in the annular recess 26. The retaining ring 24 can be made of metal or plastic and can be split, if desired; however, in view of the resiliency of the handle member 12 there will be no problem in inserting and removing the ring 24 when desired.

A metal rod or bolt 26 having enlarged head 28 at one end thereof and a threaded end 30 at the other end thereof is received in a central longitudinal opening extending longitudinally through the dowell block 20. A washer 32 received between the bottom of the head 28 and the upper end of the block 20 is connected with one prong 34 of an electrical plug 36 by means of a conduit 38. The other prong 40 of the plug 36 connects with a conduit 42 which is merely dead ended at 44 in a radial hole 46 at the upper end of the handle 12. A plastic washer 48, through which the conduits 30 and 42 are allowed to pass, is received in an annular recess 50 in the upper end of the reduced bore 18.

The lower end of the bolt 26 is provided with a threaded nut 52 which is suitably received on the threaded end 30. A metal washer 54 is received on the bolt 26 between the lower end of the block 20 and the upper end of the nut 52.

The metal probe 10 is provided with an enlarged collar 56 which is integral with the probe 10, or secured thereto in any convenient manner, at a location slightly below the lower end of the handle 12. A helical spring 58 is mounted on the probe 10 above the collar 56 such that the lower end of the spring bears against the upper part of the collar 56 and upper part of the spring bears against a flat surface 60 at the upper end of a cylindrical cavity 62 in the lower end of the wooden block 22.

The uppermost end of the probe 10 is provided with a central vertical threaded hole (not shown) in which is received a threaded screw 64. A washer 66 of larger diameter than the rod 10 is received at the upper end of the rod beneath the threaded screw 64 for the purpose of preventing downward movement of the rod 10 below the upper end of the dowell block 22. Another washer 68 is received on the rod 10 between the washer 66 and the upper end of the block 22. A resistor 70 and neon light 72 are connected in series between the washer 68 and the washer 54 as shown. The opening 74 is provided within the side of the handle 12 such that, when the neon light 72 is actuated, the same is visible through the plexiglass cylinder 16 and the opening 74.

When utilizing the device described above, for the purpose of bringing earthworms to the surface of the ground, it is important that the prong 34 of the plug 36 be connected with the ungrounded electrode or terminal in the socket (not shown) in which the plug 36 is inserted. Thus, to determine whether or not the prong 34 is connected to the proper terminal of the socket, the pointed end 11 of the probe 10 is first inserted in the ground and pressure is released from the handle. If the neon light 72 glows, this means that a circuit has been established through ground and that the plug has been properly inserted in the socket (not shown). If, however, the neon light 72 should not glow, this means that the prong 34 has been connected to the grounded terminal; therefore, it is merely necessary to reverse the plug 36 in the socket (not shown).

At any event, when the neon light 72 glows, it is now merely necessary to push down on the handle 12 thereby compressing the spring 58 and allowing contact between the upper end of the screw 64 and the lower end of the threaded portion 30 so as to short-circuit the resistor 70 and the neon light 72 at which time, of course, the neon light will go out. However, the short-circuiting of the resistor and the neon light will permit a greater amount of electricity to flow through the probe 10 into the ground thereby causing the worms to come to the surface of the ground.

The value of the resistance in the resistor 70, considered further in light of the resistance of the neon light 72 is such that a person would not receive a shock from the probe 10 when the same is in the non-retracted position shown in the drawings. Likewise, the value of the resistance in the resistor 70 and in the neon light 72 is such that sufficient current would not flow through the probe 10 in the unretracted position to bring the earthworms to the surface of the ground. Purely for purposes of illustration, the neon light 72 can be an NE-2 and the resistor 70 can be a one-half watt resistor having a value of 50K to 150K ohms.

Summarizing, the probe 10 is adapted to be inserted in the ground. When the prong 34 is connected to the ungrounded terminal of the socket into which the plug 36 is inserted, a circuit will be provided through the resistor 70, through the neon light 72 and through the probe 10, so as to light the neon light 72. When the prong 34 is connected to the ungrounded terminal and socket, the neon light will not light, thereby indicating that the plug 36 should be reversed in the socket. When the neon light is actuated, the handle portion 12 can be pushed downwardly against the action of the spring 58 to cause contact between the threaded end 30 and the screw 64 so as to short-circuit the resistor 70 and the neon lamp 72; at this point full current is allowed to flow through the probe 10 and into the ground thereby causing worms to come to the surface of the ground. Finally, the neon light and resistor 70 constitute a safety means which will prevent electrical shock if a person should accidentally touch the probe 10 prior to the introduction of the same into the ground. This invention will work on both A.C. and D.C.

Whereas the present invention has been described in particular relation to the drawings attached hereto, it should be understood that other and further modifications, apart from those shown or suggested herein, may be made within the spirit and scope of this invention.

What is claimed is:

1. Apparatus for bringing earthworms to the surface of the ground comprising a metallic probe having a pair of opposite ends, one end of said probe being insertable into the ground, an insulated handle means slidably mounted at the other end of said probe, electrical contact means mounted within said handle and spaced from said other end of said probe, resilient means mounted in said handle for urging said other end of said probe in a direction away from said electrical contact means, electrical indicating means connected between said electrical contact means and said other end of said probe, electrical plug means having a pair of prongs thereon for insertion in a standard electrical socket, said standard electrical socket having a grounded terminal and an ungrounded terminal, means connecting said electrical contact means to one of said prongs, whereby, when the probe is inserted in the ground and the connected prong is in contact with the ungrounded terminal of the socket, the electrical indicating means will be actuated, and whereby when the handle is pushed against the action of the resilient means, the electrical contact means will come into contact with said other end of said probe to short-circuit the electrical indicating means to permit the passage of current into the ground through said probe.

2. The apparatus as set forth in claim 1 wherein said electrical indicating means includes a resistor and a neon light connected in series between said electrical contact means and said other end of said probe and wherein said handle is provided with an opening to permit observation of said neon light when actuated, whereby, when the probe is inserted in the ground and the connected prong is in contact with the ungrounded terminal of the socket, the neon light will glow.

* * * * *